(12) United States Patent
Palmer et al.

(10) Patent No.: US 8,447,295 B2
(45) Date of Patent: May 21, 2013

(54) SYSTEM AND METHOD FOR OBFUSCATING SATELLITE TERMINAL TRANSMISSION ACTIVITY

(75) Inventors: John R. Palmer, Seattle, WA (US); Michael Delachapelle, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 427 days.

(21) Appl. No.: 12/274,004

(22) Filed: Nov. 19, 2008

(65) Prior Publication Data

US 2010/0124922 A1    May 20, 2010

(51) Int. Cl.
*H04W 4/00*    (2009.01)
(52) U.S. Cl.
USPC ........ 455/427; 455/522; 455/418; 455/456.5; 455/12.1; 455/98
(58) Field of Classification Search
None
See application file for complete search history.

(56) References Cited

U.S. PATENT DOCUMENTS

| | | | | |
|---|---|---|---|---|
| 5,590,405 | A * | 12/1996 | Daly et al. | 455/504 |
| 7,136,621 | B2 | 11/2006 | De La Chapelle et al. | |
| 2002/0058477 | A1 * | 5/2002 | Chapelle | 455/13.4 |
| 2004/0218559 | A1 * | 11/2004 | Kim et al. | 370/318 |
| 2008/0032733 | A1 * | 2/2008 | Hays | 455/522 |

OTHER PUBLICATIONS

White, "Transmission Security (TRANSEC) in an IP based VSAT Architecture," 5 pages, 2007.
Wikipedia, definition of "transmission security", 1 page, 2008.

* cited by examiner

*Primary Examiner* — Yuwen Pan
*Assistant Examiner* — Fanghwa Wang
(74) *Attorney, Agent, or Firm* — Klintworth & Rozenblat IP LLC

(57) ABSTRACT

A network for obfuscating satellite terminal transmission activity may include a satellite, a plurality of distributed satellite terminals transmitting signals to and receiving signals from the satellite, and a computer. The computer may compute how much transmission power spectral density each of the distributed satellite terminals is or would be transmitting based on allocated data rates of each of the distributed satellite terminals. The computer may calculate an aggregate transmission power spectral density which is being used or would be used by all of the distributed satellite terminals. The computer may calculate how much unused transmission power spectral density is available to the network for obfuscation by subtracting from a total network regulatory transmission power spectral density limit the aggregate transmission power spectral density. The computer may determine a random distribution of at least a portion of the unused transmission power spectral density to one or more of the distributed satellite terminals. The transmission power spectral density levels of one or more of the distributed satellite terminals may be adjusted by the computer to distribute the portion of the unused transmission power spectral density according to the random distribution determination.

24 Claims, 4 Drawing Sheets

SYSTEM AND METHOD FOR OBFUSCATING SATELLITE TERMINAL TRANSMISSION ACTIVITY

FIELD OF THE DISCLOSURE

The disclosure relates to systems and methods for satellite transmission obfuscation.

BACKGROUND OF THE DISCLOSURE

It is beneficial for operators of satellite communications to deny adversaries from eavesdropping on their transmissions. One way adversaries eavesdrop is by using a high gain antenna to receive a small amount of stray radio frequency radiation emitted from the side-lobes or back-lobes of satellite communication terminal antenna. The adversaries may then use a spectrum analyzer to monitor the transmit signal power spectral density over time in order to derive useful intelligence. For example, an adversary could associate an increase in power spectral density with greater activity on the terminal.

In one prior art system and method for attempting to deny adversaries from eavesdropping on satellite transmission, as provided in U.S. Pat. No. 7,136,621, code division multiple access (CDMA) signals are transmitted from the satellite communication terminal and intentionally spread in frequency using direct sequence spread spectrum modulation. This reduces the transmit power spectral density thereby lowering the probability of intercept and detection by an eavesdropper. However, if the eavesdropper gets sufficiently close to the transmitting satellite communication terminal, or if the eavesdropper uses a big enough antenna, it is possible to detect and monitor transmission activity on the terminal. The transmitted power and power spectral density may be directly proportional to the data rate of traffic transmitted from the terminal, so the eavesdropper may monitor terminal activity by measuring fluctuations in received power.

In another prior art system and method for attempting to deny adversaries from eavesdropping on satellite transmissions, the satellite communication terminal may be operated at a fixed transmit power and data rate which meets the peak power and data rate demand of the satellite communication terminal. Using this constant activity system and method, an eavesdropper may not detect change in terminal activity. However, this may be inefficient because the average demand for satellite communication terminal data rate is typically a small fraction of the peak demand constant rate.

Another prior art system and method for attempting to deny adversaries from eavesdropping on satellite transmissions in time division multiple access (TDMA) systems is to randomly assign time slots to terminals to randomize the duration and interval between transmission bursts. Without randomizing transmissions, an eavesdropper may determine peak periods of activity, identify unusual or unexpected activity spikes, and identify locations of remote terminals that have remained quiet for a period of time and suddenly experience increased traffic volumes. The adversary may subsequently extrapolate timing, location, and scale of the communications.

Another approach may use frequency division multiple access (FDMA), which may work similarly to the time division multiple access approach, except that the random assignment of unused satellite capacity may occur in the frequency domain rather than in the time domain. Alternatively the allocation may be to a fixed number of frequency slots with null data transmitted in the excess slots. However, this method may be inefficient due to the typically large difference between the actual data rate demand and the peak resource allocation, thereby reducing the useful aggregate data rate of the communication resource.

A system and method is needed that is both effective at obfuscating signal transmissions and efficient in use of satellite resources.

SUMMARY OF THE DISCLOSURE

In one aspect of the disclosure, a method is disclosed for obfuscating satellite terminal transmission activity. In one step, a network may be provided comprising a satellite, distributed satellite terminals transmitting signals to and receiving signals from the satellite, and at least one computer in communication with the network. In another step, the computer may compute how much transmission power spectral density each of the distributed satellite terminals is or would be transmitting based on allocated data rates of each of the distributed satellite terminals. In an additional step, the computer may calculate an aggregate transmission power spectral density which is being used or would be used by all of the distributed satellite terminals by adding up the computed transmission power spectral densities which each of the distributed satellite terminals is or would be using based on the allocated data rates. In still another step, the computer may calculate how much unused transmission power spectral density is available to the network for obfuscation by subtracting the aggregate transmission power spectral density from a total network regulatory transmission power spectral density limit. In an additional step, if the calculating steps establish that there is unused transmission power spectral density available to the network, the computer may determine a random distribution of at least a portion of the unused transmission power spectral density to one or more of the distributed satellite terminals in order to provide obfuscation of terminal power transmission activity. In another step, transmission power spectral density levels of one or more of the distributed satellite terminals may be adjusted to distribute the portion of the unused transmission power spectral density according to the random distribution determination of the computer.

In another aspect of the disclosure, a network is provided for obfuscating satellite terminal transmission activity. The network may comprise: a satellite; a plurality of distributed satellite terminals transmitting signals to and receiving signals from the satellite at least one computer in communication with the network; and a computer program. The computer program may compute how much transmission power spectral density each of the distributed satellite terminals is or would be transmitting based on allocated data rates of each of the distributed satellite terminals. The computer program may calculate an aggregate transmission power spectral density that is being used or would be used by adding up the computed transmission power spectral densities that each of the distributed satellite terminals is or would be using. The computer program may calculate the unused transmission power spectral density available for obfuscation by subtracting the aggregate transmission power spectral density from a total network regulatory transmission power spectral density limit. The computer program may determine a random distribution of at least a portion of the unused transmission power spectral density to one or more of the distributed satellite terminals. The computer program may adjust the transmission power spectral density levels of one or more of the distributed satellite terminals to distribute the portion of the unused transmission power spectral density according to the random distribution determination.

These and other features, aspects and advantages of the disclosure will become better understood with reference to the following drawings, description and claims.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
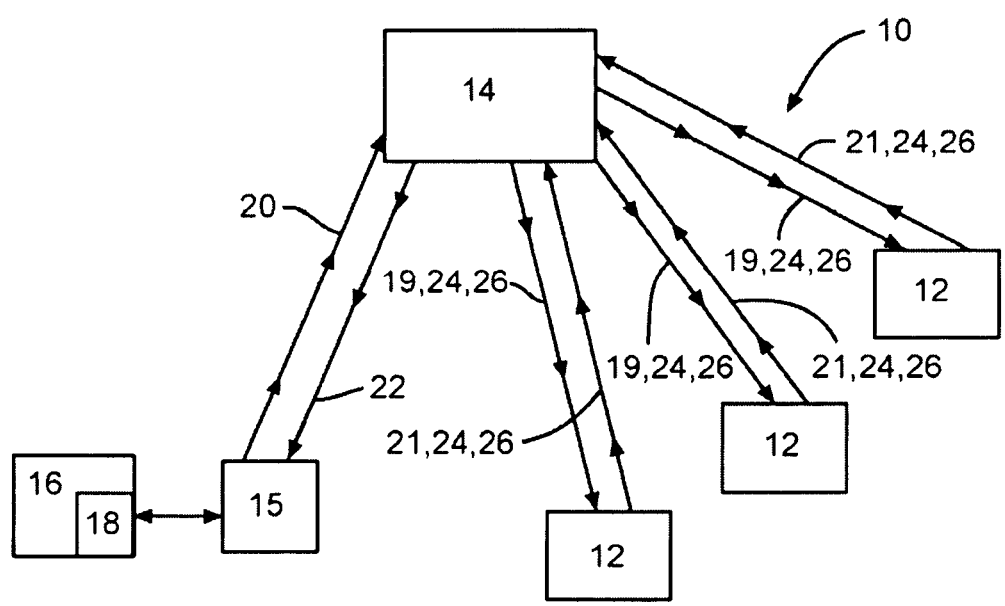
FIG. 1 is a block diagram of a network for obfuscating satellite transmissions.

FIG. 1 is a block diagram of a network 10 for obfuscating satellite terminal transmission activity. The network 10 may comprise a plurality of distributed satellite terminals 12, a satellite 14, a ground station 15, at least one computer 16, and a computer program 18. The distributed satellite terminals 12 may be fixed to the earth or installed on mobile platforms such as aircraft, spacecraft, ships, trucks, satellites, rockets, and/or other types of mobile platforms. The distributed satellite terminals 12 may transmit signals to 21 and receive signals from 19 the satellite 14. The ground station 15 may transmit signals 20 to and receive signals 22 from the satellite 14. The computer program 18 may comprise a network communication controller that is in communication with the satellite terminals 12. By means of commands to the satellite terminals 12, the computer program 18 may randomize the transmission power/activity spectral density of terminals 12 that are code division multiple access satellite communication terminals as discussed in U.S. Pat. No. 7,136,621, which is hereby incorporated by reference. In other embodiments, the computer program 18 may be used to randomize transmission power/activity spectral density of varying types of satellite terminals 12.

The computer program 18 may compute how much transmission power spectral density 24 each of the distributed satellite terminals 12 is or would be transmitting based on allocated data rates 26 of each of the distributed satellite terminals 12. The distributed satellite terminals 12 may all use spread spectrum modulation, and may all spread their transmission power spectral density 24 approximately evenly across a shared channel bandwidth. The shared channel bandwidth may remain constant as satellite terminal power levels 24 and data rates 26 change, and may result in satellite terminal transmission power spectral density that is approximately equal to the transmit power level divided by the channel bandwidth. The distributed satellite terminals 12 may share the channel bandwidth using the method of code division multiple access (CDMA).

Figure 2:
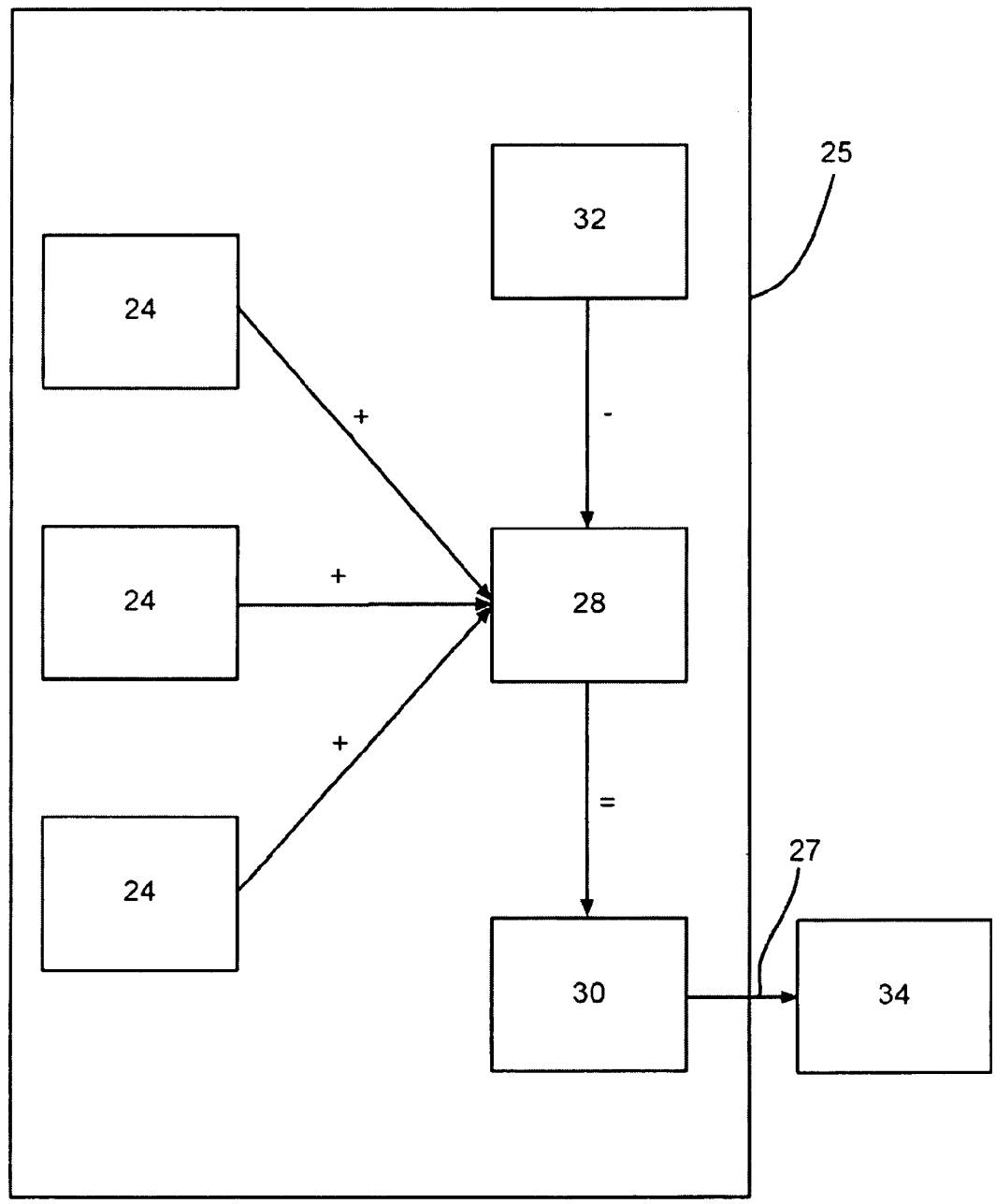
FIG. 2 is a block diagram of an algorithm a computer program of a computer of the network of FIG. 1 may apply in order to obfuscate satellite transmissions.

FIG. 2 shows a block diagram of an algorithm 25 the computer program 18 of FIG. 1 may apply in order to obfuscate satellite terminal transmission activity. The computer program 18 may calculate an aggregate transmission power spectral density 28 that is being used or would be used at the allocated data rates 26 by adding up the computed transmission power spectral densities 24 that each of the distributed satellite terminals 12 is or would be using. The computer program 18 may calculate the unused transmission power spectral density 30 available for obfuscation by subtracting from a total network regulatory transmission power spectral density limit 32 the aggregate transmission power spectral density 28. The regulatory power limit is defined in terms of power spectral density transmitted towards adjacent satellites along the geostationary arc (off-axis power spectral density), as explained in U.S. Pat. No. 7,136,621. All terminal transmissions may be spread over the same frequency bandwidth so that the transmit power may be proportional to power spectral density, which may also be proportional to the off-axis power spectral density. The following terminology is used interchangeably: power, power spectral density, and off-axis power spectral density. The regulatory power limit 32 on maximum allowed network transmission power spectral density may be towards adjacent satellites as defined by Federal Communications Commission (FCC) 25.209, which is hereby incorporated by reference. The computer program 18 may determine a random distribution 34, using an algorithm 27, of at least a portion of the unused transmission power spectral density 30 to one or more of the distributed satellite terminals 12. In one embodiment, the computer program 18 may determine a random distribution 34 of all of the unused transmission power spectral density 30 to one or more of the distributed satellite terminals 12.

The computer program 18 may adjust the transmission power spectral density levels 24 of one or more of the distributed satellite terminals 12 to distribute the portion of the unused transmission power spectral density 30 randomly to one or more of the distributed satellite terminals 12 according to the random distribution determination 34. In one embodiment, the computer program 18 may adjust the transmission power spectral density levels 24 of one or more of the distributed satellite terminals 12 to distribute all of the unused transmission power spectral density 30 according to the random distribution determination 34 in order to obfuscate the network 10. If the computer program 18 determines that there is no unused transmission power spectral density 30 available to the network 10, the computer program 18 may not determine a random distribution 34 of unused transmission power spectral density 30, and may instead reduce the transmission power spectral density levels 24 of the distributed satellite terminals 12 in order to avoid exceeding the total network regulatory transmission power spectral density limit 32.

The computer program 18 may continuously adjust in real-time for changes in the transmission power spectral density 24 and the data rates 26 of each of the distributed satellite terminals 12. In one embodiment, the computer program 18 may not adjust the allocated data rates 26 of the distributed satellite terminals 12 as the computer program 18 adjusts the transmission power spectral density levels 24 of the one or more distributed satellite terminals 12. In another embodiment, the computer program 18 may adjust the allocated data rates 26 of the distributed satellite terminals 12 by inserting non-information carrying bits into the data stream. These data rate 26 adjustments may be made to be proportional to the adjustments the computer program 18 makes to the transmission power spectral density levels 24 of the distributed satellite terminals 12.

In still another embodiment, if one or more of the distributed satellite terminals 12 requests from the network 10 a data rate 26 adjustment, the computer program 18 may determine if there would be unused transmission power spectral density 30 available to the network 10 if the network 10 accommodated the data rate 26 adjustment. If the computer program 18 determines that there would not be unused transmission power spectral density 30 available to the network 10 if the network 10 accommodated the data rate 26 adjustment, the network 10 may not allow the requested data rate 26 adjustment. If the computer program 18 determines that there would be unused transmission power spectral density 30 available to the network 10 if the network 10 accommodated the data rate 26 adjustment, the computer program 18 may allow the requested data rate 26 adjustment, and the computer program 18 may determine a random distribution 34 of at least a portion of the unused transmission power spectral density 30 at the allowed, requested data rate 26 adjustment. The network 10 may adjust the transmission power spectral density levels 24 of one or more of the distributed satellite terminals 12 to distribute the portion of the unused transmission power spectral density 30 according to the random distribution determination 34 at the allowed, requested data rate 26 adjustment.

In an additional embodiment, if the computer program 18 determines that there would be unused transmission power spectral density 30 available to the network 10 if the network 10 accommodated the data rate 26 adjustment, the computer program 18 may allow the requested data rate 26 adjustment for the one or more distributed satellite terminals 12 which requested the adjustment, but may not adjust the allocated data rates 26 of the remaining distributed satellite terminals 12 which did not request the adjustment. In another embodiment, if the computer program 18 determines that there would be unused transmission power spectral density 30 available to the network 10 if the network 10 accommodated the data rate 26 adjustment, the computer program 18 may allow the requested data rate 26 adjustment for the one or more distributed satellite terminals 12 which requested the adjustment, and may also adjust the allocated data rates 26 of the remaining distributed satellite terminals 12 which did not request the adjustment by inserting non-information carrying bits into the stream to increase satellite transmission data rates. These adjustments may be made to be proportional to the adjustments which were made to the transmission power spectral density levels 24 of the distributed satellite terminals 12.

Figure 3:
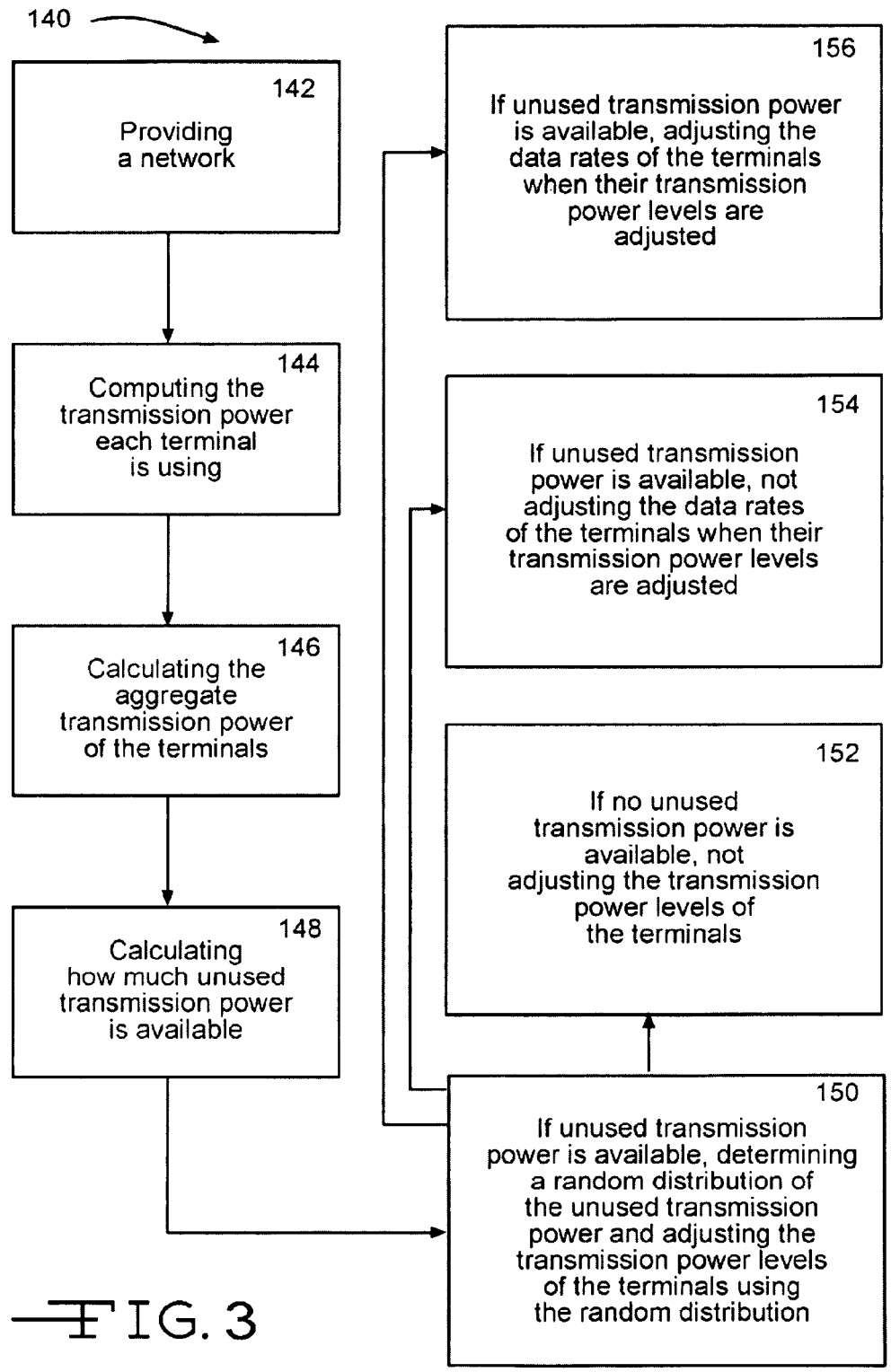
FIG. 3 is a flowchart of one embodiment of a method for obfuscating satellite transmissions.

FIG. 3 is a flowchart of one embodiment of a method 140 for obfuscating satellite terminal transmission activity. The method 140 may be used in real-time, and may continuously adjust in real-time for changes in the transmission power spectral density 24 and the data rates 26 of each of the distributed satellite terminals 12. In one step 142, a network 10 may be provided comprising a satellite 14, distributed satellite terminals 12 transmitting signals 21 to and receiving signals 19 from the satellite 14, and at least one computer 16 in communication with the network 10. The provided network 10 may further comprise a ground station 15 transmitting signals 20 to and receiving signals 22 from the satellite 14. The distributed satellite terminals 12 may be fixed to the earth or installed on mobile platforms such as aircraft, spacecraft, ships, trucks, satellites, rockets, or other mobile platforms. The computer program 18 may comprise a network communication controller that is in communication with the satellite terminals 12.

In another step 144, the computer 16 may compute how much transmission power spectral density 24 each of the distributed satellite terminals 12 is or would be transmitting based on allocated data rates 26 of each of the distributed satellite terminals 12. In an additional step 146, the computer 16 may calculate an aggregate transmission power spectral density 28 which is being used or would be used by all of the distributed satellite terminals 12 by adding up the computed transmission power spectral densities 24 which each of the distributed satellite terminals 12 is or would be using based on the allocated data rates 26. In still another step 148, the computer 16 may calculate how much unused transmission power spectral density 30 is available to the network 10 for obfuscation by subtracting from a total network regulatory transmission power spectral density limit 32 the aggregate transmission power spectral density 28.

In another step 150, if the calculating steps 146-148 establish that there is unused transmission power spectral density 30 available to the network 10, the computer 16 may determine a random distribution 34, using an algorithm 27, of at least a portion of the unused transmission power spectral density 30 to one or more of the distributed satellite terminals 12 in order to provide obfuscation of terminal power transmission activity. During step ISO, the computer 16 may additionally adjust the transmission power spectral density levels 24 of one or more of the distributed satellite terminals 12 to distribute the portion of the unused transmission power spectral density 30 according to the random distribution determination 34. In one embodiment, step 150 may comprise determining a random distribution 34 of all of the unused transmission power spectral density 30, and setting the transmission power spectral density levels 24 of one or more of the distributed satellite terminals 12 to distribute all of the unused transmission power spectral density 30 according to the random distribution determination 34.

If the computer program 18 determines that there is no unused transmission power spectral density 30 available to the network 10, in step 152, the computer program 18 may not determine a random distribution 34 of unused transmission power spectral density 30 and may not adjust the transmission power spectral density levels 24 of the distributed satellite terminals 12 in order to avoid exceeding the total network regulatory transmission power spectral density limit 32.

In one embodiment, if the calculating steps 146-148 establish that there is unused transmission power spectral density 30 available to the network 10, in optional step 154, the allocated data rates 26 of the distributed satellite terminals 12 may not be adjusted when the transmission power spectral density levels 24 of the one or more distributed satellite terminals 12 are adjusted to obfuscate satellite terminal transmission activity on the network 10. In another embodiment, if the calculating steps 146-148 establish that there is unused transmission power spectral density 30 available to the network 10, in optional step 156, the allocated data rates 26 of the distributed satellite terminals 12 may be adjusted, to be proportional to the adjustments made to the transmission power spectral density levels 24 of the distributed satellite terminals 12, by inserting non-information carrying bits into their data streams.

Figure 4:
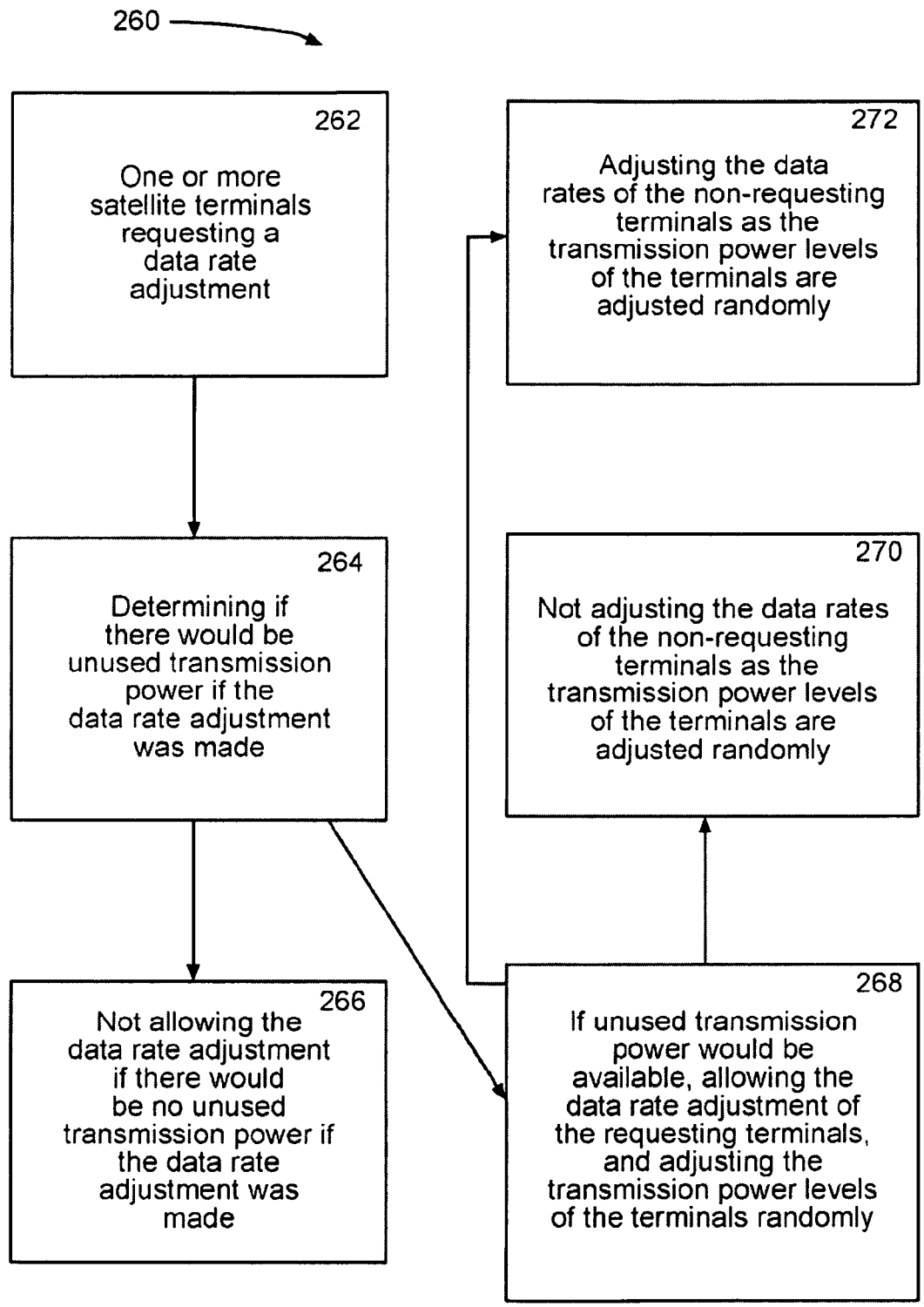
FIG. 4 is a flowchart of another embodiment of a method which may be used in conjunction with one or more steps of the method of FIG. 3 in order to obfuscate satellite transmissions.

FIG. 4 is a flowchart of another embodiment of a method 260 which may be used in conjunction with one or more steps of the method 140 of FIG. 3 in order to obfuscate satellite terminal transmission activity in step 262, at least one of the distributed satellite terminals 12 may request from the network 10 a data rate 26 adjustment. In step 264, the computer 16 may follow steps 144-148 of method 140 of FIG. 3 in order to determine if there would be unused transmission power spectral density 30 available to the network 10 if the network 10 accommodated the data rate 26 adjustment. In step 266, the network 10 may not allow the requested data rate 26 adjustment if the computer 16 determined that there would not be unused transmission power spectral density 30 available to the network 10 if the network 10 accommodated the data rate 26 adjustment.

In step 268, if the computer 16 determined that there would be unused transmission power spectral density 30 available to the network 10 if the network 10 accommodated the data rate 26 adjustment, the network 10 may do the following: allow the requested data rate 26 adjustment; follow step 150 of method 140 of FIG. 3 in order to determine a random distribution 34 of at least a portion of the unused transmission power spectral density 30; and adjust the transmission power spectral density levels 24 of one or more of the distributed satellite terminals 12 to distribute the portion of the unused transmission power spectral density 30 according to the random distribution determination 34 at the requested data rate 26 adjustment.

In optional step 270, if the computer 16 determined that there would be unused transmission power spectral density 30 available to the network 10 if the network 10 accommodated the data rate 26 adjustment, and the network 10 subsequently allowed the requested data rate 26 adjustment to the requesting satellite terminal 12, the network 10 may not further adjust the allocated data 26 rates of the remaining non-requesting distributed satellite terminals 12 when the transmission power spectral density levels 24 of the distributed satellite terminals 12 are/were adjusted to obfuscate satellite terminal transmission activity on the network 10.

In optional step 272, if the computer 16 determined that there would be unused transmission power spectral density 30 available to the network 10 if the network 10 accommodated the data rate 26 adjustment, and the network 10 subsequently allowed the requested data rate 26 adjustment to the requesting satellite terminal 12, the network 10 may also adjust the allocated data rates 26 of the non-requesting distributed satellite terminals 12 by inserting non-information carrying bits into the bit stream to increase satellite terminal transmission data rates. These adjustments may be proportional to the adjustments made to the transmission power spectral density levels 24 of the distributed satellite terminals 12, when the transmission power spectral density levels 24 of the one or more distributed satellite terminals 12 are/were adjusted to obfuscate the satellite terminal transmission activity on the network 10.

One or more embodiments of the disclosure may reduce one or more problems of one or more of the prior art systems and methods by randomizing the transmission power/activity spectral density of code division multiple access satellite communication terminals (which are discussed in U.S. Pat. No. 7,136,621) by varying the transmit power to the terminals, using unused transmission power spectral density, while maintaining the aggregate transmission power spectral density of the network to levels that are at or below established regulatory limits. This may allow for communications to be obfuscated on code division multiple access satellites without degrading quality of service, while efficiently managing satellite communication resources by distributing the resources to the satellite terminals that need it, taking it away from those that don't, and randomly allocating the excess resources to the terminals in order to obfuscate the satellite communications.

It should be understood, of course, that the foregoing relates to exemplary embodiments of the disclosure and that modifications may be made without departing from the spirit and scope of the disclosure as set forth in the following claims.

We claim:

1. A method for obfuscating satellite terminal transmission activity comprising:
    providing a network comprising a satellite, distributed satellite terminals transmitting signals to and receiving signals from the satellite, and at least one computer in communication with the network;
    calculating using the at least one computer how much unused transmission power spectral density is available to the network for obfuscation;
    if the calculating step establishes that there is the unused transmission power spectral density available to the network, determining using the at least one computer, using an algorithm, a random distribution of at least a portion of the unused transmission power spectral density to one or more of the distributed satellite terminals in order to provide obfuscation of the distributed satellite terminal transmission activity, and adjusting a transmission power spectral density level of one or more of the distributed satellite terminals to distribute said portion of the unused transmission power spectral density according to the random distribution determination of the at least one computer;
    determining whether or not allocated data rates of the one or more distributed satellite terminals are to be adjusted;
    if the determining step determines that the allocated data rates are to be adjusted, adjusting the allocated data rates of the one or more distributed satellite terminals, to be proportional to the adjustment to the transmission power spectral density level of the one or more distributed satellite terminals, by inserting non-information carrying bits into their data streams when the transmission power spectral density level of the one or more distributed satellite terminals are adjusted to distribute said portion of the unused transmission power spectral density according to the random distribution determination of the at least one computer in order to obfuscate the distributed satellite terminal transmission activity; and
    if the determining step determines that the allocated data rates are not to be adjusted, not adjusting the allocated data rates of the one or more distributed satellite terminals when the transmission power spectral density level of the one or more distributed satellite terminals is adjusted to distribute said portion of the unused transmission power spectral density according to the random distribution determination of the at least one computer in order to obfuscate the distributed satellite terminal transmission activity.

2. The method of claim 1 wherein the provided network further comprises a ground station transmitting signals to and receiving signals from the satellite.

3. The method of claim 1 wherein the distributed satellite terminals are attached to at least one of a ground, an aircraft, a spacecraft, a ship, a truck, a satellite, or a rocket.

4. The method of claim 1 wherein the method is real-time and is used continuously to adjust for changes in the unused transmission power spectral density available to the network for obfuscation.

5. The method of claim 1 wherein the determining step comprises determining the random distribution using all of the unused transmission power spectral density for one or more of the distributed satellite terminals, and the adjusting step comprises setting the transmission power spectral density level of one or more of the distributed satellite terminals to distribute all of the unused transmission power spectral density according to the random distribution determination of the at least one computer in order to obfuscate the distributed satellite terminal transmission activity.

6. The method of claim 1 further comprising the steps of: if the calculating steps establish that there is none of the unused transmission power spectral density available to the network, the at least one computer not determining the random distribution of the unused transmission power spectral density and not adjusting the transmission power spectral density level of the distributed satellite terminals.

7. The method of claim 1 further comprising the steps of: at least one of the distributed satellite terminals requesting from the network a data rate adjustment; the at least one computer following the steps of the method to determine if there would be the unused transmission power spectral density available to the network if the network accommodated the data rate adjustment; and, if the at least one computer determines that there would be the unused transmission power spectral density available to the network if the network accommodated the data rate adjustment, the network allowing the requested data rate adjustment, the network following the steps of the method to determine the random distribution of at least the portion of the unused transmission power spectral density, and the network adjusting the transmission power spectral density level of the one or more distributed satellite terminals to distribute said portion of the unused transmission power spectral density according to the random distribution determination at the requested data rate adjustment.

8. The method of claim 7 further comprising the step of: if the at least one computer determines that there would be the unused transmission power spectral density available to the network if the network accommodated the data rate adjustment of the at least one requesting distributed satellite terminal, the network allowing the requested data rate adjustment of the at least one requesting distributed satellite terminal, but not further adjusting allocated data rates of the remaining non-requesting distributed satellite terminals when the transmission power spectral density level of the one or more distributed satellite terminals is adjusted to distribute said portion of the unused transmission power spectral density according to the random distribution determination of the at least one computer in order to obfuscate the distributed satellite terminal transmission activity.

9. The method of claim 7 further comprising the step of: if the at least one computer determines that there would be the unused transmission power spectral density available to the network if the network accommodated the data rate adjustment of the at least one requesting distributed satellite terminal, the network allowing the requested data rate adjustment of the at least one requesting distributed satellite terminal, and also adjusting allocated data rates of the remaining non-requesting distributed satellite terminals, to be proportional to the adjustment made to the transmission power spectral density level of the distributed satellite terminals, by inserting non-information carrying bits into their bit streams.

10. The method of claim 7 further comprising the step of the network not allowing the requested data rate adjustment if the at least one computer determines that there would not be the unused transmission power spectral density available to the network if the network accommodated the data rate adjustment.

11. A network for obfuscating satellite terminal transmission activity comprising:
a satellite;
a plurality of distributed satellite terminals for transmitting signals to and receiving signals from the satellite;
at least one computer in communication with the network; and
a computer program, the computer program configured to: calculate how much unused transmission power spectral density is available to the network for obfuscation; use an algorithm to determine a random distribution of at least a portion of the unused transmission power spectral density to one or more of the distributed satellite terminals in order to provide obfuscation of the distributed satellite terminal transmission activity; adjust a transmission power spectral density level of one or more of the distributed satellite terminals to distribute said portion of the unused transmission power spectral density according to the random distribution determination; determine whether or not allocated data rates of the one or more distributed satellite terminals are to be adjusted; if the determine step determines that the allocated data rates are to be adjusted, adjust and adjusting allocated data rates of the one or more distributed satellite terminals, to be proportional to the adjustment to the transmission power spectral density level of the one or more distributed satellite terminals, by inserting non-information carrying bits into their data streams when the transmission power spectral density level of the one or more distributed satellite terminals are adjusted to distribute said portion of the unused transmission power spectral density according to the random distribution determination of the at least one computer in order to obfuscate the distributed satellite terminal transmission activity; and if the determine step determines that the allocated data rates are not to be adjusted, not adjust the allocated data rates of the one or more distributed satellite terminals when the transmission power spectral density level of the one or more distributed satellite terminals is adjusted to distribute said portion of the unused transmission power spectral density according to the random distribution determination of the at least one computer in order to obfuscate the distributed satellite terminal transmission activity.

12. The network of claim 11 further comprising a ground station configured to transmit signals to and receive signals from the satellite.

13. The network of claim 11 wherein the distributed satellite terminals are attached to at least one of a ground, an aircraft, a spacecraft, a ship, a truck, a satellite, or a rocket.

14. The network of claim 11 wherein the computer program is configured to continuously adjust in real-time for changes in the unused transmission power spectral density available to the network for obfuscation.

15. The network of claim 11 wherein the computer program is configured to determine the random distribution using all of the unused transmission power spectral density for one or more of the distributed satellite terminals, and is configured to adjust the transmission power spectral density levels of one or more of the distributed satellite terminals to distribute all of the unused transmission power spectral density according to the random distribution determination of the computer program in order to obfuscate the distributed satellite terminal transmission activity.

16. The network of claim 11 wherein the computer program is configured to not determine the random distribution of the unused transmission power spectral density and to not adjust the transmission power spectral density level of the distributed satellite terminals when there is none of the unused transmission power spectral density available to the network.

17. The network of claim 11 wherein the computer program is configured to, when at least one of the distributed satellite terminals requests from the network a data rate adjustment, determine if there would be the unused transmission power spectral density available to the network if the network accommodated the data rate adjustment; and, if the computer program determines that there would be the unused transmission power spectral density available to the network if the network accommodated the data rate adjustment, the computer program is configured to allow the requested data rate adjustment, determine the random distribution of at least the portion of the unused transmission power spectral density, and to adjust the transmission power spectral density level of the one or more distributed satellite terminals to distribute said portion of the unused transmission power spectral density according to the random distribution at the requested data rate adjustment.

18. The network of claim 17 wherein the computer program is configured to, if it determines that there would be the unused transmission power spectral density available to the network if the network accommodated the requested data rate adjustment of the at least one requesting distributed satellite terminal, allow the requested data rate adjustment for the at least one distributed satellite terminal which requested the data rate adjustment, but to not adjust allocated data rates of the remaining distributed satellite terminals which did not request the data rate adjustment as the transmission power spectral density level of the one or more distributed satellite terminals is adjusted to distribute said portion of the unused transmission power spectral density according to the random distribution determination in order to obfuscate the distributed satellite terminal transmission activity.

19. The network of claim 17 wherein the computer program is configured to, when it determines that there would be the unused transmission power spectral density available to the network if the network accommodated the data rate adjustment of the at least one requesting distributed satellite terminal, allow the requested data rate adjustment for the at least one distributed satellite terminal which requested the data rate adjustment, and to adjust allocated data rates of the remaining non-requesting distributed satellite terminals, to be proportional to the adjustment made to the transmission power spectral density level of the distributed satellite terminals, by inserting non-information carrying bits into their bit streams.

20. The network of claim 17 wherein the computer program is configured to not allow the requested data rate adjustment when the computer program determines that there would not be the unused transmission power spectral density available to the network if the network accommodated the data rate adjustment.

21. The method of claim 1 further comprising calculating using the at least one computer how much of the unused transmission power spectral density is available to the network for obfuscation by subtracting an aggregate transmission power spectral density of the distributed satellite terminals from a total network regulatory transmission power spectral density limit.

22. The method of claim 21 further comprising: computing using the at least one computer how much transmission power spectral density each of the distributed satellite terminals is or would be transmitting based on allocated data rates of each of the distributed satellite terminals; and calculating using the at least one computer the aggregate transmission power spectral density which is being used or would be used by all of the distributed satellite terminals by adding up the computed transmission power spectral densities which each of the distributed satellite terminals is or would be using based on the allocated data rates.

23. The network of claim 11 wherein the computer program is further configured to calculate how much of the unused transmission power spectral density is available to the network for obfuscation by subtracting an aggregate transmission power spectral density of the distributed satellite terminals from a total network regulatory transmission power spectral density limit.

24. The network of claim 23 wherein the computer program is further configured to compute how much of the transmission power spectral density each of the distributed satellite terminals is or would be transmitting based on allocated data rates of each of the distributed satellite terminals, and to calculate the aggregate transmission power spectral density which is being used or would be used by all of the distributed satellite terminals by adding up the computed transmission power spectral densities which each of the distributed satellite terminals is or would be using based on the allocated data rates.

* * * * *